US011892189B2

(12) United States Patent
Wilson et al.

(10) Patent No.: US 11,892,189 B2
(45) Date of Patent: Feb. 6, 2024

(54) MULTI-LAYER INLET DIFFUSER FOR A TERMINAL UNIT

(71) Applicant: Johnson Controls Technology Company, Auburn Hills, MI (US)

(72) Inventors: Timothy J. Wilson, Saint Petersburg, FL (US); Tyler J. Williams, Seminole, FL (US); Darren W. Mounts, Seminole, FL (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 272 days.

(21) Appl. No.: 16/836,765

(22) Filed: Mar. 31, 2020

(65) Prior Publication Data

US 2021/0239354 A1 Aug. 5, 2021

Related U.S. Application Data

(60) Provisional application No. 62/969,121, filed on Feb. 2, 2020.

(51) Int. Cl.
*F24F 13/08* (2006.01)
*F24F 11/88* (2018.01)
(Continued)

(52) U.S. Cl.
CPC .............. *F24F 11/88* (2018.01); *F24F 11/89* (2018.01); *F24F 13/072* (2013.01); (Continued)

(58) Field of Classification Search
CPC ........ F24F 13/072; F24F 13/08; F24F 13/082; F24F 13/24; F24F 13/18; F24F 2013/088; (Continued)

(56) References Cited

U.S. PATENT DOCUMENTS 3,823,768 A * 7/1974 Finger ........................ F24F 1/00 165/59
4,418,719 A * 12/1983 Downs, Jr. .......... F24F 13/1486 454/333

(Continued)

FOREIGN PATENT DOCUMENTS

CH 676034 A5 * 11/1990
CN 202299528 7/2012

(Continued)

OTHER PUBLICATIONS

Air Control Products, The New Price FDC: FDC-G2 Fan Powered Box, Mar. 30, 2017, Air Control Products, https://www.aircontrolproducts.com/new-price-fdc-fdc-g2-fan-powered-box/ (Year: 2017).*

(Continued)

*Primary Examiner* — Edelmira Bosques
*Assistant Examiner* — Michael James Giordano
(74) *Attorney, Agent, or Firm* — Fletcher Yoder, PC

(57) ABSTRACT

A terminal unit of a heating, ventilation, and/or air conditioning (HVAC) system includes a fan configured to provide an airflow through the HVAC unit by drawing the airflow into a fan inlet and expelling the airflow out of a fan outlet. The terminal unit also includes an inlet diffuser disposed upstream of the fan inlet relative to a direction of the airflow, wherein the inlet diffuser includes a first layer of perforated metal and a second layer of perforated metal disposed between the first layer of perforated metal and the fan inlet.

20 Claims, 10 Drawing Sheets

(51) Int. Cl.

| | |
|---|---|
| ***F24F 11/89*** | (2018.01) |
| ***F24F 13/072*** | (2006.01) |
| ***F24F 13/24*** | (2006.01) |
| ***G10K 11/00*** | (2006.01) |
| *F24F 13/20* | (2006.01) |

(52) U.S. Cl.
CPC ............ *F24F 13/082* (2013.01); *F24F 13/24* (2013.01); *G10K 11/002* (2013.01); *F24F 2013/088* (2013.01); *F24F 2013/205* (2013.01)

(58) Field of Classification Search
CPC ........... B60H 2001/00085; B60H 2001/00092; B60H 2001/006
See application file for complete search history.

(56) References Cited

U.S. PATENT DOCUMENTS

| | | | | |
|---|---|---|---|---|
| 5,979,595 | A * | 11/1999 | Harris | F04D 29/703 181/222 |
| 6,622,818 | B2 | 9/2003 | Jenvey | |
| 7,328,586 | B2 | 2/2008 | Gau et al. | |
| 9,580,178 | B2 | 2/2017 | Bultemeier et al. | |
| 10,203,703 | B2 * | 2/2019 | Ashton | G05D 7/0173 |

FOREIGN PATENT DOCUMENTS

| | | | |
|---|---|---|---|
| CN | 202928056 | | 5/2013 |
| CN | 105423437 | A * | 3/2016 |
| CN | 106123153 | | 11/2016 |
| CN | 107054006 | | 8/2017 |
| CN | 107202414 | | 9/2017 |
| CN | 207065834 | | 3/2018 |
| CN | 109595730 | A * | 4/2019 |
| CN | 208952347 | | 6/2019 |
| DE | 2328875 | C2 * | 11/1989 |
| JP | 2011106757 | A * | 6/2011 |
| JP | 2013222191 | | 10/2013 |
| KR | 943859 | | 2/2010 |
| WO | 2009041937 | | 4/2009 |

OTHER PUBLICATIONS

Which Terminal Unit (VAV Box) is Right for Me?, Jun. 26, 2018, WGI, https://wginc.com/which-terminal-unit-vav-box-is-right-for-me/ (Year: 2018).*

Fan Noise: How to Control Air Turbulences, Jul. 10, 2014, ebmpabst, https://info.ebmpapst.us/ebm-papst/bid/183768/Fan-Noise-How-to-Control-Air-Turbulences (Year: 2014).*

Price Industries, "FDC—Series Flow Fan Powered Terminal Unit" Website: https://www.priceindustries.com/terminalunits/products/fdc-fpc-constant-volume-series-flow 2021, pp. 1-3.

Nailor Industries Inc. "Standard Profile" Website: https://nailor.com/products/terminal-units/fan-powered-terminal-units/series/standard-profile/model-series-35s-and-35sst pp. 1-4.

Titus, "DTQS Digital Series Fan Powered Terminal" Website: https://www.titus-hvac.com/Products/Terminal%20Units/DTQS 2021.

* cited by examiner

MULTI-LAYER INLET DIFFUSER FOR A TERMINAL UNIT

CROSS-REFERENCE TO RELATED APPLICATIONS

This application claims priority from and the benefit of U.S. Provisional Application Ser. No. 62/969,121, entitled "TERMINAL UNIT OF A HEATING, VENTILATION, AND/OR AIR CONDITIONING (HVAC) SYSTEM," filed Feb. 2, 2020, which is herein incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and air conditioning (HVAC) systems are generally configured to provide temperature controlled air to an internal space. For example, in certain traditional systems, an airflow (e.g., a conditioned airflow) may be provided to a number of terminal units positioned in various rooms or on various floors of a building. In certain traditional embodiments, the airflow may be additionally or alternatively conditioned at the terminal unit. In general, each terminal unit is configured to distribute the conditioned airflow to the room(s) and/or floor(s) associated with the terminal unit.

Traditional terminal units may be expensive to manufacture and install, and may operate inefficiently. It is now recognized that improved packaging and design may enhance performance, improve manufacturing and installation processes, and reduce cost.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An embodiment of the present disclosure includes a heating, ventilation, and/or air conditioning (HVAC) system having a fan configured to provide an airflow through the HVAC unit by drawing the airflow into a fan inlet and expelling the airflow out of a fan outlet. The HVAC system also includes an inlet diffuser disposed upstream of the fan inlet relative to a direction of the airflow. The inlet diffuser includes a first layer of perforated material and a second layer of perforated material disposed adjacent to the first layer of perforated material.

Another embodiment of the present disclosure includes a terminal unit of a heating, ventilation, and/or air conditioning (HVAC) system. The terminal unit includes a housing defining an airflow path, a fan disposed in the airflow path and configured to move an airflow through the airflow path and into a room, and an inlet diffuser. The inlet diffuser is disposed in the airflow path upstream of the fan, wherein the inlet diffuser includes a first layer of perforated material and a second layer of perforated material disposed between the first layer of perforated material and the fan.

Another embodiment of the present disclosure includes a terminal unit of a heating, ventilation, and/or air conditioning (HVAC) system. The terminal unit includes a housing defining an airflow path and having one or more panels that include a conditioned air inlet and an air outlet. The terminal unit also includes an inlet diffuser disposed in the airflow path adjacent to the conditioned air inlet and between the conditioned air inlet and the air outlet, wherein the inlet diffuser includes a first layer of perforated metal and a second layer of perforated metal disposed between the first layer of perforated metal and the fan.

BRIEF DESCRIPTION OF THE DRAWINGS

Various aspects of this disclosure may be better understood upon reading the following detailed description and upon reference to the drawings in which.

DETAILED DESCRIPTION

Figure 1:
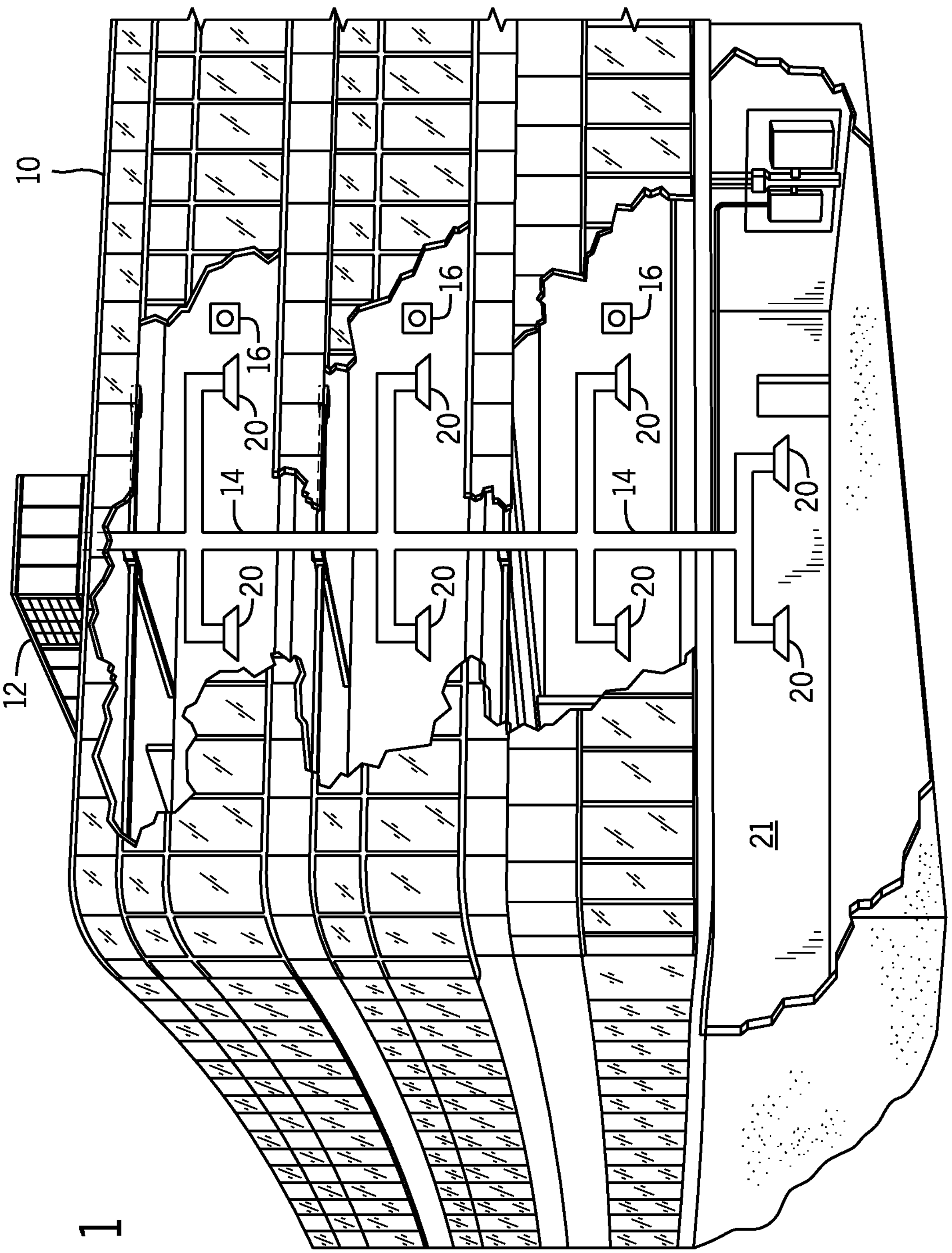
FIG. 1 is a perspective view a heating, ventilation, and air conditioning (HVAC) system for building environmental management, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terminals "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to various features of a terminal unit of a commercial, industrial, or residential heating, ventilation, and air conditioning ("HVAC") system. In particular, the present disclosure is directed to an air diffuser of a terminal unit, an integral electrical enclosure of a terminal unit, and an integral sound attenuator of a terminal unit.

HVAC systems are generally configured to provide temperature controlled air to an internal space. In certain systems, an airflow (e.g., a conditioned airflow) may be provided to a number of terminal units positioned in various rooms or on various floors of a building. The airflow may be conditioned via a rooftop unit (RTU), a boiler, a chiller, the terminal unit, or any combination thereof. Other conditioning systems, structures, or schemes are also possible. In general, each terminal unit is configured to distribute the conditioned airflow to the room(s) and/or floor(s) associated with the terminal unit.

In accordance with present embodiments, the terminal unit may include an air inlet diffuser having multiple layers of perforated material. For example, each layer may include perforated metal. The multiple layers of perforated material may be disposed between an air balancing valve associated with the terminal unit and a fan of the terminal unit. The multiple layers of perforated material may cause a pressure drop between the air balancing valve and the fan. The pressure drop may reduce a load on the air balancing valve and improve airflow distribution to the fan, which may improve airflow performance/distribution and reduce a load on the fan. Reducing the load on the fan and/or the air balancing valve may also reduce a power consumption of the terminal unit, may enhance a life of the fan and/or air balancing valve, or a combination thereof. Further, the multiple layers of perforated material may be formed, for example, by low cost materials, such as sheet metal. Thus, the enhanced performance described above is not caused by materials or configurations having excessive costs. In addition to the above-described technical effects, the air inlet diffuser having multiple layers of perforated material may reduce sound or noise caused by the terminal unit (e.g., by improving airflow distribution and/or reducing a load on the fan and air balancing valve).

The terminal unit may additionally or alternatively include an integral electrical enclosure. For example, a housing of the terminal unit may define one or more airflow paths and the electrical enclosure. In particular, the housing may include a shared or common wall between the airflow path and the electrical enclosure. In some embodiments, electrical components may be directly mounted on the shared or common wall. Additionally or alternatively, in some embodiments, the housing may include panels that partially define the airflow path and partially define a cavity (e.g., electrical cavity) of the electrical enclosure. That is, the shared or common wall between the airflow path and the electrical enclosure may be positioned at or adjacent to a mid-section of each of the panels. Thus, the panels may extend beyond either side of the shared or common wall to partially define the airflow path and the cavity of the electrical enclosure. In some embodiments, a lid may extend between the panels of the housing to enclose the cavity of the electrical enclosure (e.g., between the shared or common wall, the panels, and the lid). Additionally or alternatively, other features may be incorporated to segment or bi-furcate the electrical enclosure into a first portion (e.g., high-voltage portion) that receives high-voltage electrical equipment and a second portion (e.g., low-voltage portion) that receives low-voltage electrical equipment. In general, the above-described integral electrical enclosure may reduce an overall footprint of the terminal unit, may improve geometry of the terminal unit over embodiments having irregular geometries contributable to separately and/or externally manufactured and installed electronic equipment, and may improve manufacturing and installation costs and processes.

The terminal unit may additionally or alternatively include an integrally formed sound attenuator. For example, the terminal unit may include a sound attenuator integrated with a return air chamber of the terminal unit and/or a separating wall between the return air chamber and a mixed air chamber (e.g., where the mixed air chamber receives return air from the return air chamber and conditioned air from a conditioned air duct or air balancing valve associated with the conditioned air duct). In particular, a housing and the separating wall of the terminal unit may define the return air chamber and the mixed air chamber. The sound attenuator may be incorporated with panels of the housing bordering the return air chamber and/or the separating wall. For example, fiberglass insulation and/or closed cell foam of the integral sound attenuator may be included with the panels of the housing, the separating wall, or both. The above-described integral sound attenuator may reduce a sound or noise of the terminal unit and may improve manufacturing and installation costs and processes. These and other features will be described in detail below with reference to the drawings.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10. However, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system.

The HVAC unit 12 is an air cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is a rooftop unit (RTU) that conditions a supply air stream, such as environmental air and/or a return airflow from the building 10. Outdoor units or other conditioning schemes are also possible. After the HVAC unit 12 conditions the air, the air is supplied to the building 10 via ductwork 14 extending throughout the building 10 from the HVAC unit 12. For example, the ductwork 14 may extend to various individual floors or other sections, such as rooms, of the building 10. Terminal units 20 associated with the floors, rooms, or other sections of the building 10 may be connected to the ductwork 14 and may be configured to distribute the airflow to the floors, rooms, or other sections of the building 10. In some embodiments, the terminal units 20 may include air conditioning features in addition to, or in the alternate of, the air conditioning features of the HVAC unit 12.

In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream. Additionally or alternatively, other HVAC equipment may be installed at the terminal units 20 or in another area of the building, such as a basement 21 (e.g., a boiler may be installed in the basement 21). A control device 16, one type of which may be a thermostat, may be used to designate the temperature of the conditioned air. The control device 16 also may be used to control the flow of air from the HVAC unit 12, through the ductwork 14, to the terminal units 20, or any combination thereof. For example, the control device 16 may be used to regulate operation of one or more components of the HVAC unit 12 and/or terminal units 20. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
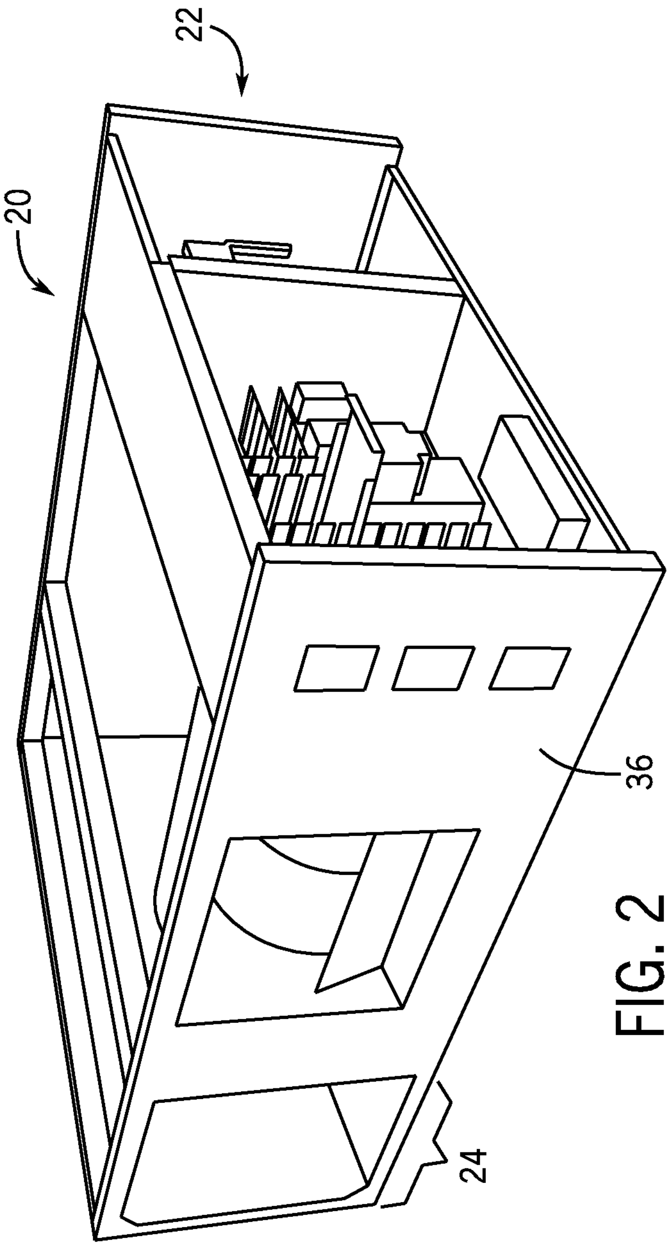
FIG. 2 is a perspective view of a terminal unit for use in the HVAC system of FIG. 1, in accordance with an aspect of the present disclosure.

FIG. 2 is a perspective view of one of the terminal units 20 of FIG. 1. In the illustrated embodiment, the terminal unit 20 includes a housing 36 in which some or all of the components of the terminal unit 20 are disposed. The terminal unit 20 includes an electrical enclosure 22 integral with the housing 36 and a sound attenuator 24 integral with the housing 36. The terminal unit 20 also includes an inlet air diffuser (not shown) having multiple layers of perforated material. The inlet air diffuser will be described in detail below with reference to FIGS. 3-7, the integral electrical enclosure 22 will be described in detail below with reference to FIGS. 8-11, and the integral sound attenuator will be described in detail below with reference to FIGS. 12-14. As illustrated in FIG. 2, embodiments of the inlet air diffuser, the integral electrical enclosure 22, and the integral sound attenuator may all be included in a single one of the terminal units 20.

Figure 3:
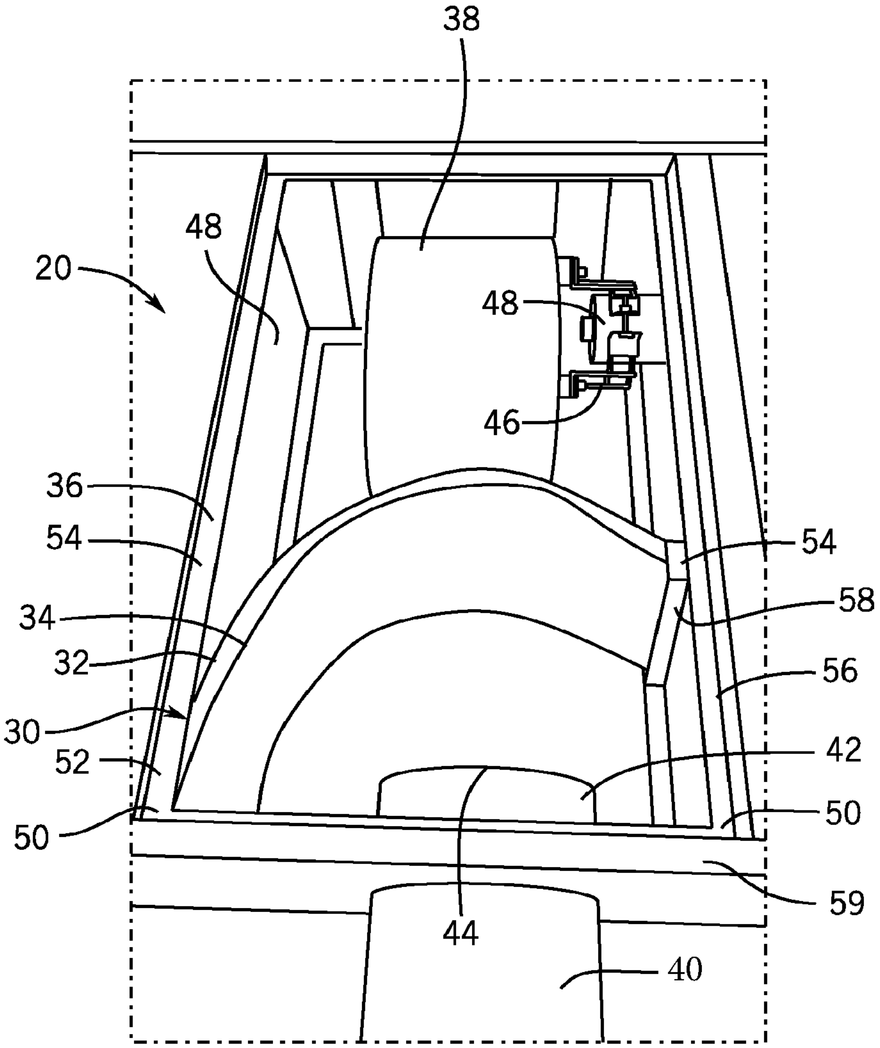
FIG. 3 is an underside perspective view of a portion of the terminal unit of FIG. 2, where the portion includes an inlet air diffuser having a first layer of perforated material and a second layer of perforated material, in accordance with an aspect of the present disclosure.

FIG. 3 is an underside perspective view of an embodiment of a portion of one of the terminal units 20 of FIG. 2, having an inlet air diffuser 30 including a first layer of perforated material 32 and a second layer of perforated material 34. For example, the illustrated portion of the terminal unit 20 may include a chamber that receives at least conditioned air from the duct 40 (and, in some embodiments, receives return air from a return air chamber, described in detail with respect to FIGS. 12-14).

While the illustrated embodiment of the inlet air diffuser 30 includes only the first and second layers of perforated material 32, 34, additional layers may also be present (e.g., a third layer, a fourth layer, etc.). The first layer of perforated material 32 in the illustrated embodiment may be positioned immediately adjacent the second layer of perforated material 34. Each layer 32, 34 may be coupled to the housing 36 of the terminal unit 20. A fan 38 of the terminal unit 20 may be positioned within the housing 36, and may be configured to draw an airflow through a duct 40 and toward the inlet air diffuser 30. The duct 40 includes an air balancing valve 42 extending across a cross-section of the duct 40. The air balancing valve 42 is configured to balance the airflow to the terminal unit 20 and to each of the other terminal units 20 associated with the HVAC system (e.g., other terminal units associated with other floors or rooms of the building serviced by the HVAC system). In the illustrated embodiment, the air balancing valve 42 is positioned at an end 44 of the duct 40 and within the housing 36 of the terminal unit 20. In other embodiments, the air balancing valve 42 may be positioned along a different area of the duct 40.

As the airflow passes from the end 44 of the duct 40 into the housing 36 of the terminal unit 20, the airflow may pass through the first and second layers 32, 34 of the inlet air diffuser 30. The perforated material of the first and second layers 32, 34 may cause a pressure drop between the fan 38 and the air balancing valve 42. The pressure drop generated by the first and second layers 32, 34 may reduce a load on, or an amount of work done by, the air balancing valve 42. This may improve airflow performance, reduce sound, and/or reduce an operating cost of the terminal unit 20. Further, the first and second layers 32, 34 of the perforated material may improve airflow distribution to the fan 38. For example, the fan 38 may be a centrifugal fan driven by a motor 46 and having one or more inlets 48. In the illustrated embodiment, the fan 38 includes two inlets 48. However, the fan 38 may include only one inlet 48 on a side of the fan 38 opposing the motor 46. As described above, the layers of perforated material 32, 34 of the inlet air diffuser 30 may improve airflow distribution (e.g., airflow uniformity) to the one or more inlets 48 of the fan 38, which may reduce a load on (or power consumption of) the fan 38. The fan 38 may then output the airflow toward the floor and/or room receiving the airflow from the terminal unit 20.

In the illustrated embodiment, the inlet air diffuser 30 includes the two layers of perforated material 32, 34 attached to, or attached adjacent to, a corner 50 (or end) associated with a first wall 52 (or panel) of the housing 36, and to a mid-section 54 associated with a second wall 56 (or panel) opposing the first wall 52. A bracket 58 may be utilized to connect the two layers of perforated material 32, 34 to the mid-section 54 of the second wall 56. It should be noted that "mid-section" should not be interpreted as a half-way point, but instead a section or point between ends of the corresponding wall 52. In certain embodiments, the illustrated configuration may enable placement of a return air gap along the first wall 52 and downstream from the inlet air diffuser 30. That is, the return air gap may cause a return air to flow into the illustrated chamber downstream from the diffuser 30 (e.g., from a return air chamber separated from the illustrated chamber by the wall 52). In another embodiment, the return air gap and/or the diffuser 30 may be positioned and oriented such that the return air gap passes the return air to a portion of the illustrated chamber upstream of the diffuser 30, causing the return air and the conditioned air from the duct 40 to pass through the diffuser 30. The return air gap will be described in detail with reference to later figures.

As shown, the two layers of perforated material 32, 34 may form a concave curvature facing the end 44 of the duct 40, or facing the air balancing valve 42. Further, the two layers of perforated material 32, 34 include curvatures that generally correspond to one another (e.g., do not oppose each other). The illustrated configuration may improve airflow performance, sound reduction, and other features in certain configurations of the terminal unit 20. However, other configurations are possible and described in detail below.

Figure 4:
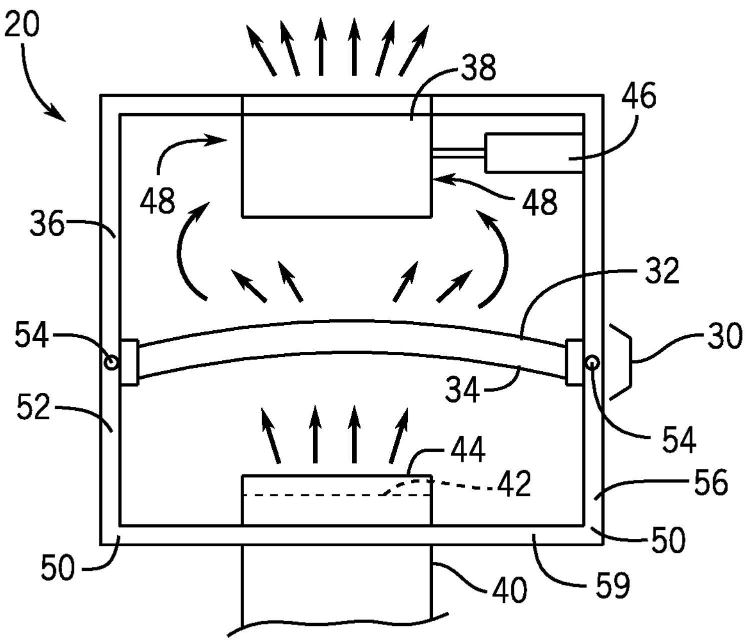
FIG. 4 is a schematic underside view of a portion of the terminal unit of FIG. 2, where the portion includes an inlet air diffuser having a first layer of perforated material and a second layer of perforated material, in accordance with an aspect of the present disclosure.

FIG. 4 is a schematic underside view of an embodiment of the terminal unit 20. In the illustrated embodiment, the terminal unit 20 includes the inlet air diffuser 30 having the first and second layers of perforated material 32, 34. The first and second layers of perforated material 32, 34 include the concave curvature facing the end 44 of the duct 40 (or the air balancing valve 42 therein) and are coupled or mounted at mid-sections 54 of the opposing walls 52, 56 (or panels) of the housing 36. As previously described, a return air gap of the terminal unit 20 may be positioned upstream of the diffuser 30 or downstream from the diffuser 30.

Figure 5:
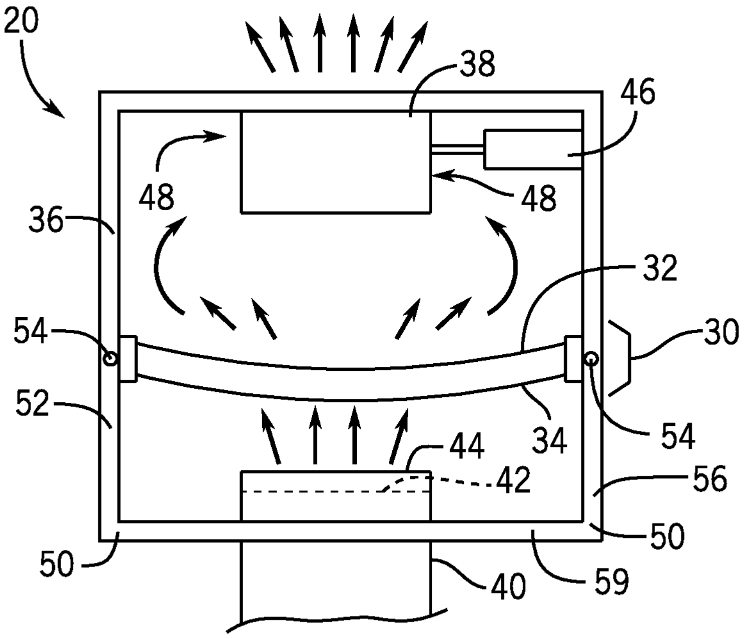
FIG. 5 is a schematic underside view of a portion of the terminal unit of FIG. 2, where the portion includes an inlet air diffuser having a first layer of perforated material and a second layer of perforated material, in accordance with an aspect of the present disclosure.

FIG. 5 is a schematic underside view of another embodiment of the terminal unit 20. In the illustrated embodiment, the first and second layers of perforated material 32, 34 are coupled to the mid-sections 54 of the opposing walls 52, 56 (or panels) of the housing 36. However, unlike FIGS. 3 and 4, the first and second layers of perforated material 32, 34 in FIG. 4 include a convex curvature facing the end 44 of the duct 40 (or the air balancing valve 42 therein). As previously described, a return air gap of the terminal unit 20 may be positioned upstream of the diffuser 30 or downstream from the diffuser 30.

Figure 6:
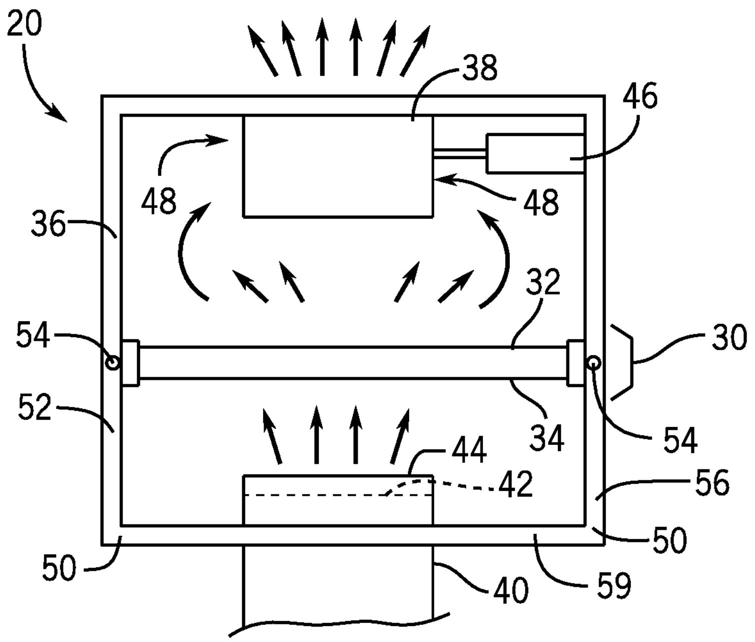
FIG. 6 is a schematic underside view of a portion of the terminal unit of FIG. 2, where the portion includes an inlet air diffuser having a first layer of perforated material and a second layer of perforated material, in accordance with an aspect of the present disclosure.

FIG. 6 is a schematic underside view of another embodiment of the terminal unit 20. In the illustrated embodiment, the first and second layers of perforated material 32, 34 are coupled to the mid-sections 54 of the opposing walls 52, 56 (or panels) of the housing 36. However, unlike FIGS. 3-5, the first and second layers of perforated material 32, 34 in FIG. 6 include do not include a substantial curvature, and instead are flat. In other words, the first and second layers of perforated material 32, 34 are substantially perpendicular (e.g., within engineering tolerances and margins) to the first wall 52 (or panel) of the housing 36, the second wall 56 (or panel) of the housing 36, or both. As previously described, a return air gap of the terminal unit 20 may be positioned upstream of the diffuser 30 or downstream from the diffuser 30.

Figure 7:
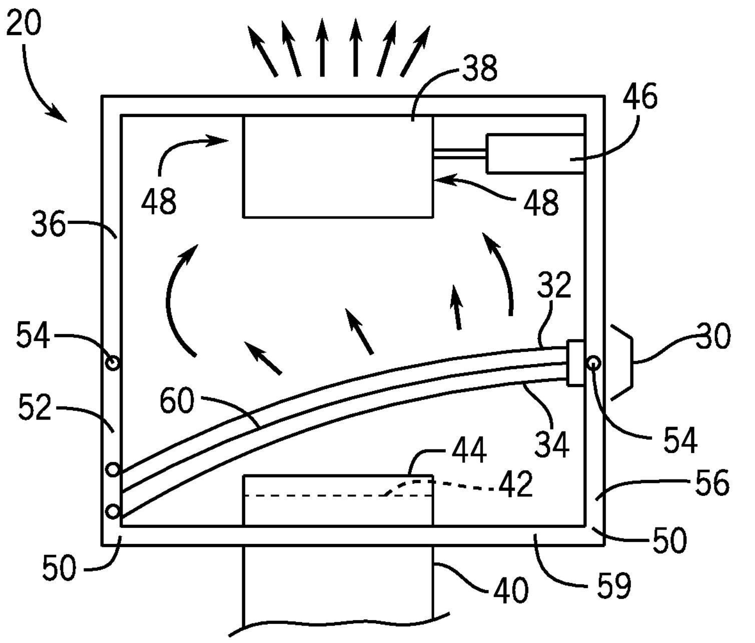
FIG. 7 is a schematic underside view of a portion of the terminal unit of FIG. 2, where the portion includes an inlet air diffuser having a first layer of perforated material and a second layer of perforated material, in accordance with an aspect of the present disclosure.

FIG. 7 is a schematic underside view of an embodiment of the terminal unit 20. In FIG. 7, a film 60 is positioned between the first layer of perforated material 32 and the second layer of perforated material 34. The film may be included to enhance the pressure drop and/or clean the airflow passing over the inlet air diffuser 30 of contaminants. Further, in FIG. 7, the diffuser 30 is coupled to a corner 50 (or end) of the wall 52 and the mid-section 54 of the wall 56. As previously described, a return air gap of the terminal unit 20 may be positioned upstream of the diffuser 30 or downstream from the diffuser 30.

It should be noted that the diffuser 30 may include various combinations of the above-described features. For example, the diffuser 30 may include a concave curvature coupled at the mid-sections 54 of both walls 52, 56, or at the corners 50 (or end) of both walls 52, 56. The diffuser 30 may include a straight orientation, similar to FIG. 6, but coupled at the corner 50 (or end) of one wall (e.g., wall 52 or 56) and at the mid-section 54 of the opposing wall (e.g., the other of wall 52 or 56). Other combinations are also possible.

Further, in any of the embodiments illustrated in FIGS. 3-7, the first and second layers of perforated material 32, 34 may include perforated metal. For example, the first and second layers 32, 34 may be formed by perforated sheet metal. The perforated metal may provide desirable airflow performance in the illustrated configurations. Other materials that enable the above-described technical effects may include certain types of plastic or resin. In general, the perforated material is a low cost material that does not substantially contribute to a cost of the terminal unit 20. Thus, the disclosed inlet air diffuser 30 having the first and second layers 32, 34 of perforated material may enhance performance of the terminal unit 20, reduce sound or noise of the terminal unit 20, improve manufacturing and/or installation processes, etc. It should be noted that the portions of the terminal unit 20 illustrated in FIGS. 2-6 may not include all the features of the terminal unit 20. For example, as will be appreciated in view of the description below, the terminal unit 20 illustrated in FIGS. 2-6 may additionally or alternatively include an integral electrical enclosure, an integral sound attenuator, or both.

Further, in any of the embodiments illustrated in FIGS. 3-7, the first layer of perforated material 32 and the second layer of perforated material 34 may be spaced based on manufacturing demands and airflow performance. For example, the layers 32, 34 may be spaced to reduce a volume or footprint of the terminal unit 20 while enabling improved airflow over traditional embodiments. In particular, the layers 32, 34 may be spaced from each other within a range of 0.5 inches and 3 inches, or within a range of 0.75 inches and 2 inches. In certain embodiments, the spacing between the layers 32, 34 may be approximately or substantially equal at any given location along the layers 32, 34, or across a majority of the layers 32, 34.

Figure 8:
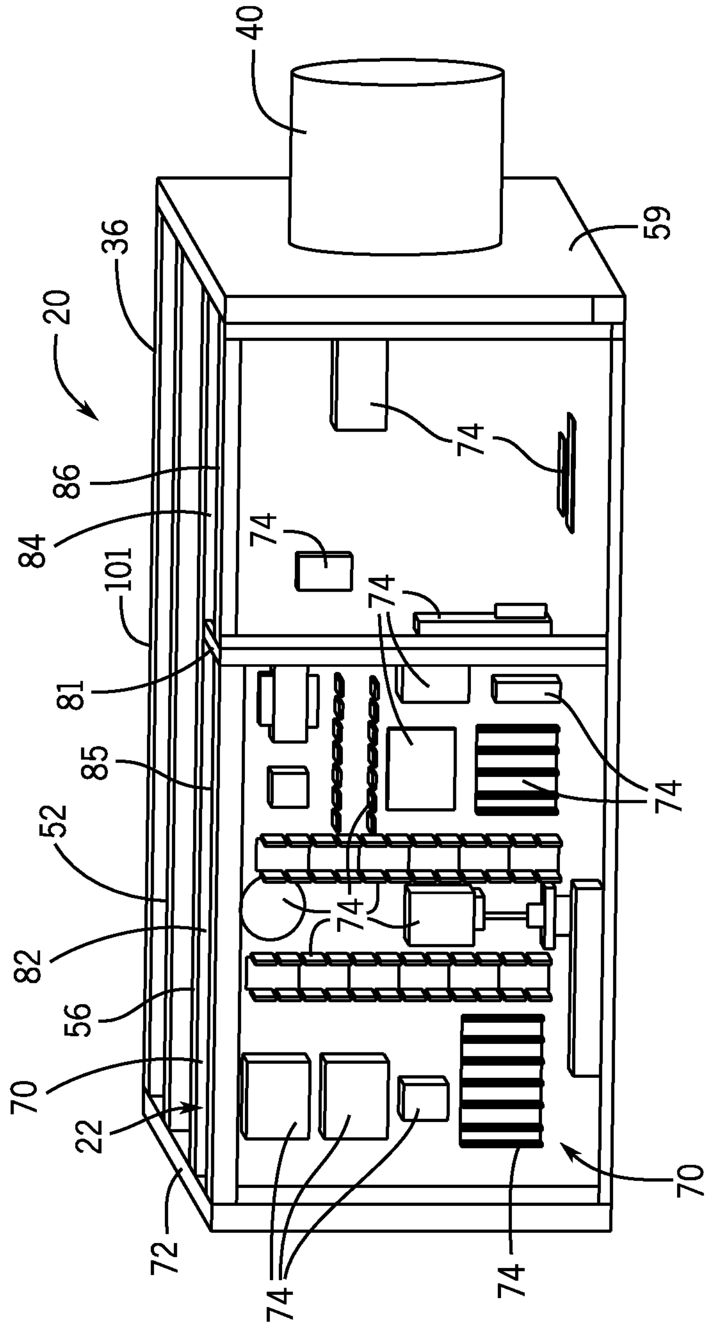
FIG. 8 is a perspective view of the terminal unit of FIG. 2, where the terminal unit includes a housing having an integral electrical enclosure, in accordance with an aspect of the present disclosure.

FIG. 8 is a perspective view of an embodiment of the terminal unit 20 of FIG. 2, where the terminal unit 20 includes the housing 36 having the integral electrical enclosure 22. For example, the housing 36 may include components (e.g., walls or panels) that define the integral electrical enclosure 22. In particular, the wall 56 (or panel) of the housing 36, previously described with respect to the inlet air diffuser features, may operate as a common or shared wall between an airflow path of the terminal unit 20 and a cavity 70 of the integral electrical enclosure 22. Further, the end wall 59 (or end panel), through which the duct 40 extends, may partially define the cavity 70 of the integral electrical enclosure 22, together with an opposing end wall 72 of the housing 36. In some embodiments, at least a portion of various electrical equipment 74 may be mounted directly on the common or shared wall 56. The electrical equipment 74 may include, for example, a controller, a wire routing assembly, and the like. Further, as shown, the cavity 70 of the integral electrical enclosure 22 may be segmented or bi-furcated into a high-voltage portion and a low-voltage portion.

Figure 9:
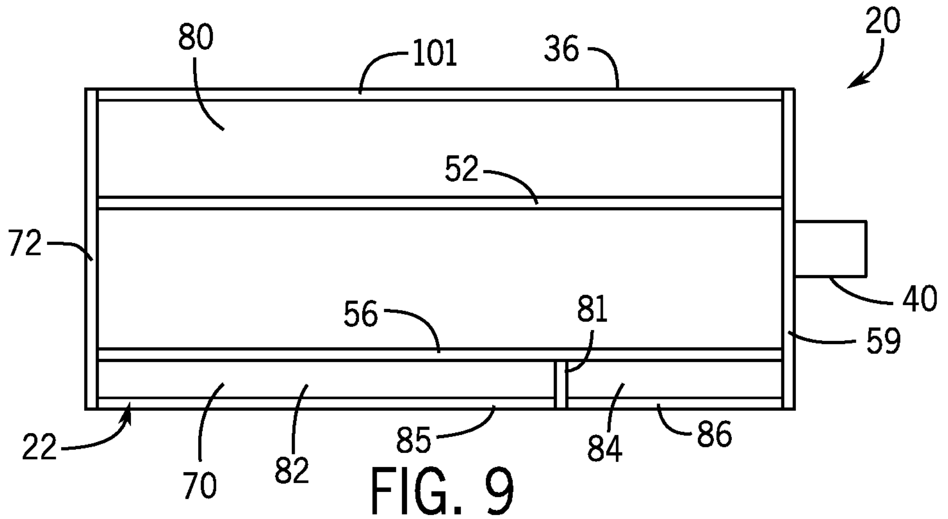
FIG. 9 is a schematic overhead view of the terminal unit of FIG. 2, where the terminal unit includes a housing having an integral electrical enclosure, in accordance with an aspect of the present disclosure.

FIG. 9 is a schematic overhead view of an embodiment of the terminal unit of FIG. 2, where the terminal unit 20 includes the housing 36 having the integral electrical enclosure 22. As previously described, the housing 36 includes the common or shared wall 56 (or panel) between one or more airflow paths 80 (e.g., including the inlet air diffuser disposed therein and described with respect to FIGS. 3-7) and the integral electrical enclosure 22. The integral electrical enclosure 22 may include the cavity 70 bi-furcated, for example by a bi-furcating wall 81, into a first portion 82 (e.g., corresponding to one of a high-voltage portion or low-voltage portion) and a second portion 84 (e.g., corresponding to the other of the high-voltage portion or low-voltage portion).

In the illustrated embodiment, the first portion 82 corresponds to the high-voltage portion of the integral electrical enclosure 22, sometimes referred to as the line-voltage portion. The first portion 82 (e.g., high-voltage portion) may include high-voltage (e.g., line-voltage) equipment, such as a line-voltage component mounting board (CMB) (e.g., the connection point for incoming power), a circuit disconnect, a toggle switch (e.g., circuit interrupter for incoming power), various fuses included for protecting the circuit by breaking the circuit when incoming current surpasses the designed current, a fused disconnect, three transformers (e.g., a first transformer for converting a high-voltage signal into low-voltage signal, a second transformer for converting a high-voltage signal into a different high-voltage signal, and a third transformer for isolating a dependent circuit), a ground lug or ground wire, a fan relay (e.g., a magnetic switch operated with an alternating current [AC] signal), an inductor that reduces current in an electronically commutated motor [ECM] (e.g., in cases of unexpected jumps in current), a line reactor, an electric heat contractor (e.g., a magnetic switch operated with low-voltage current to activate a device operated at a different current), a pulse width modulation (PWM) board (e.g., configured to convert direct current [DC] signals into PWM waves to operate the ECM motor, a solid state relay (e.g., an electronics switch operated with low-voltage current to activate a device such as a heating element operated at a different current), a current sensor communicatively coupled with the unit controller, and/or a proportional heat board.

In the illustrated embodiment, the second portion 84 corresponds to the low-voltage portion of the integral electrical enclosure 22, sometimes referred to as the control-voltage portion. The second portion 84 (e.g., low-voltage portion) may include low-voltage (e.g., control-voltage) equipment, such as a control-voltage CMB (e.g., the unit controller that operates the unit based on different sensor inputs and operating arrangements), an airflow switch (e.g., air pressure sensor that sends a signal to the unit controller), and an 8-pin terminal configured to connect to an operator's electrical connections.

In some embodiments, the first portion 82 may include a first frame member positioned therein (having either high-voltage or low-voltage equipment positioned within the first frame), and the second portion 84 may include a second frame member positioned therein (having either high-voltage or low-voltage equipment positioned within the first frame). The first and second frame members may be rectangular frames.

As shown, the end wall 59 (or panel) and the opposing end wall 72 (or panel) of the housing 36 may extend beyond the shared or common wall 56 to define at least a portion of the cavity 70 of the integral electrical enclosure 22 and the one or more airflow paths 80. In other words, the end wall 59 (or panel) forms a T-shape with the shared or common wall 56. The opposing end wall 72 (or panel) also forms a T-shape with the shared or common wall 56. In the illustrated embodiment, a first lid 85 corresponding to the first portion 82 may enclose the first portion 82, and a second lid 86 corresponding to the second portion 84 may enclose the second portion 84. However, other enclosure techniques may also be possible, as described below.

Figure 10:
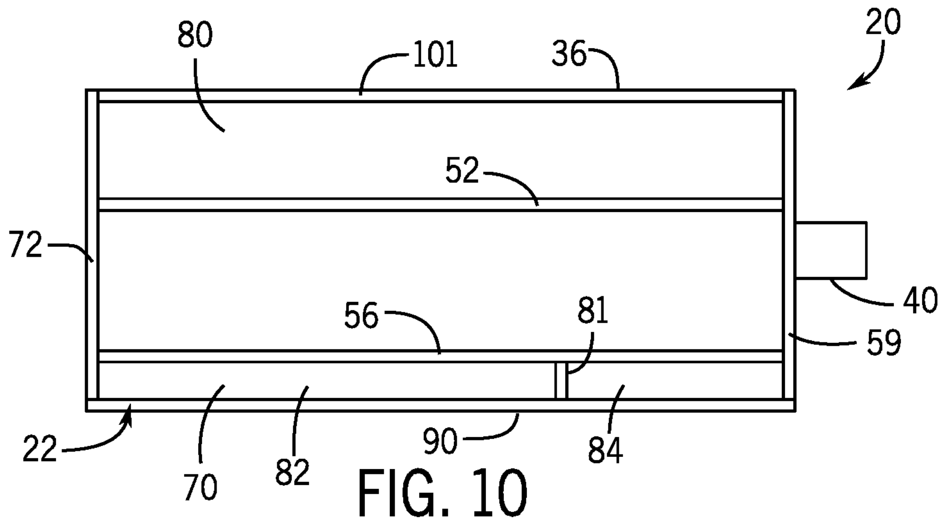
FIG. 10 is a schematic overhead view of the terminal unit of FIG. 2, where the terminal unit includes a housing having an integral electrical enclosure, in accordance with an aspect of the present disclosure.
Figure 11:
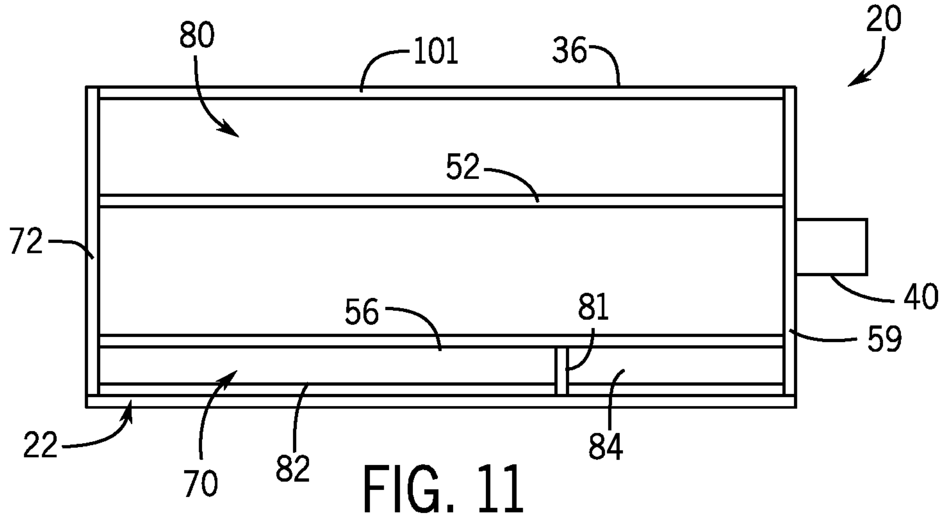
FIG. 11 is a schematic overhead view of the terminal unit of FIG. 2, where the terminal unit includes a housing having an integral electrical enclosure, in accordance with an aspect of the present disclosure.

For example, in FIG. 10, the cavity 70 of the electrical enclosure 22 is defined at least partially by the end wall 59 (or panel), the opposing end wall 72 (or panel), and the common wall 56 between the cavity 70 and the one or more airflow paths 80. Unlike in FIG. 9, FIG. 10 includes a single lid 90 extending from the end wall 59 to the opposing end wall 72. In FIG. 10, the cavity 70 of the electrical enclosure 22 is defined at least partially by the end wall 59 (or panel), the opposing end wall 72 (or panel), and the common wall 56 between the cavity 70 and the one or more airflow paths 80. Unlike in FIGS. 9 and 10, FIG. 11 includes both the single lid 90 extending from the end wall 59 to the opposing end wall 72, and the separate first and second lids 85, 86 corresponding to the first and second portions 82, 84 of the cavity 70. In each of the embodiments illustrated in FIGS. 8-11, the integral electrical enclosure 22 is defined in part by the common wall 56 (or panel) and the opposing end walls 59, 72 (or panels). The integral electrical enclosure 22 may reduce manufacturing and installation costs, and may improve manufacturing and installation processes and techniques.

In each of FIGS. 8-11, the wall 52 may separate the one or more airflow paths 80 into a mixed air chamber and a return air chamber. For example, as previously described, the wall 52 may include a return air gap that passes return air from the return air chamber into the mixed air chamber, and the duct 40 may pass conditioned air into the mixed air chamber. Thus, the return air chamber may be defined between the wall 52 and an additional wall 101 included in the embodiments illustrated in FIGS. 8-11. The return air chamber, an integral sound attenuator associated with the return air chamber, the return air gap, and the mixed air chamber are described in detail below with reference to FIGS. 12-14. Further, the wall 56 may separate the integral electrical enclosure 22 from the mixed air chamber and return air chamber, collectively referred to as "airflow channel." In this way, both the wall 52 and the wall 56 may be referred to as "separating" or "common" walls.

Figure 12:
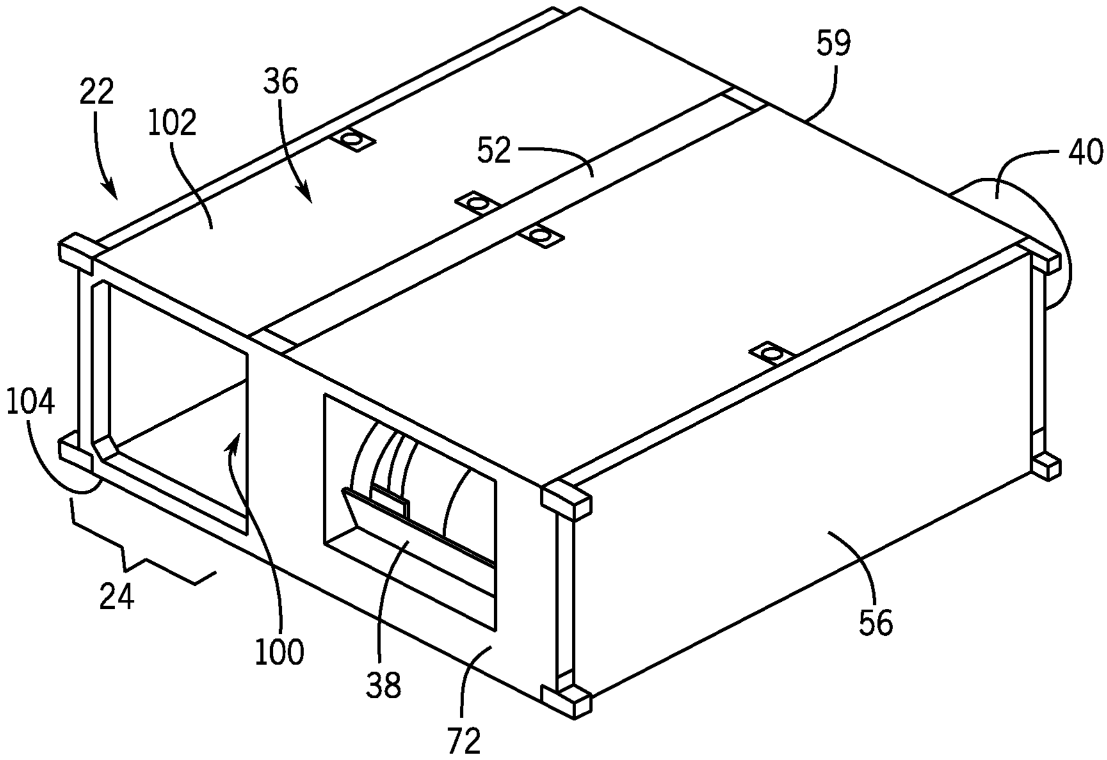
FIG. 12 is a perspective view of the terminal unit of FIG. 2, where the terminal unit includes a housing having an integral sound attenuator, in accordance with an aspect of the present disclosure.

FIG. 12 is a perspective view of an embodiment of the terminal unit 20 of FIG. 2, where the terminal unit 20 includes the housing 36 having the integral sound attenuator 24. Although not included in the illustrated embodiment, the above-described integral electrical enclosure may be disposed on or along the wall 52 (or panel) of the housing 36 in FIG. 12.

The integral sound attenuator 24 may be formed along aspects of the terminal unit 20 and corresponding housing 36 as described below. The housing 36 may include a return air inlet 100 configured to receive return air drawn into the housing 36 via the fan 38. The return air may be delivered through the return air inlet 100 to a return air chamber defined within the housing 36. Panels or walls of the housing 36 bordering the return air chamber, including portions of the end walls 59, 72, the wall 52 between the return air chamber and a mixed air chamber (described in detail below), a top wall 102, a bottom wall 104, and the above-described additional wall 101 may facilitate or form the integral sound attenuator 24. Indeed, the above-described aspects of the housing 36 may include fiberglass insulation and/or closed-cell foam that contributes to sound attenuation. These and other features are described in detail below.

Figure 13:
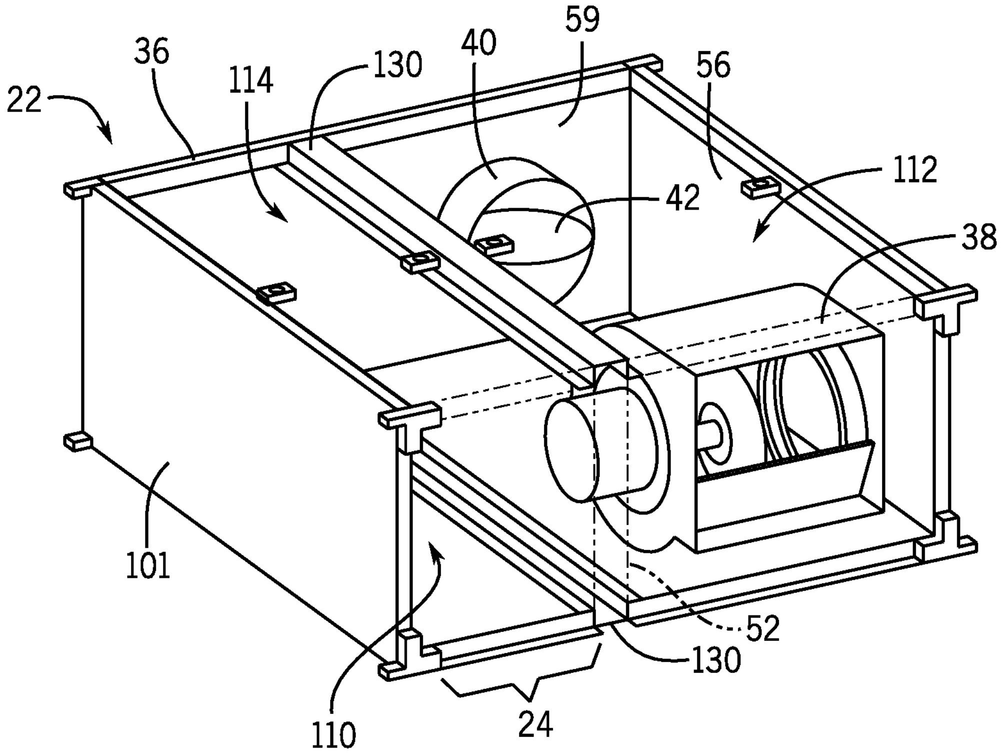
FIG. 13 is a cutaway perspective view of the terminal unit of FIG. 2, where the terminal unit includes a housing having an integral sound attenuator, in accordance with an aspect of the present disclosure.
Figure 14:
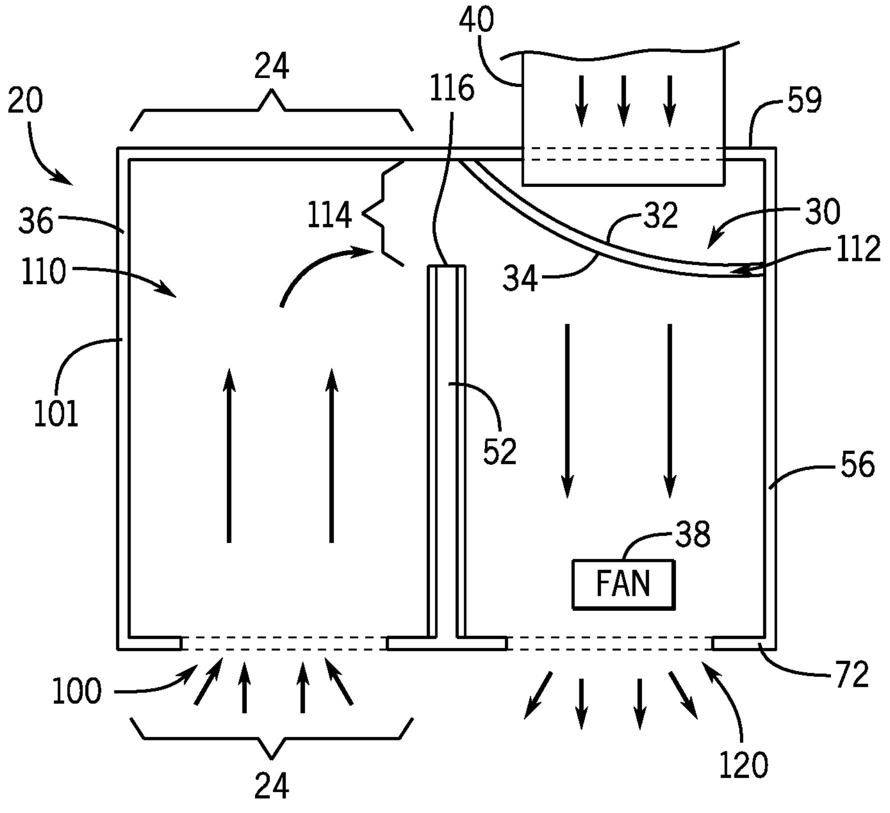
FIG. 14 is a cross-sectional schematic overhead view of the terminal unit of FIG. 2, where the terminal unit includes a housing having an integral sound attenuator, in accordance with an aspect of the present disclosure.

FIG. 13 is a cutaway perspective view of an embodiment of the terminal unit 20 of FIG. 2, where the terminal unit 20 includes the housing 36 having the integral sound attenuator 24. FIG. 14 is a cross-sectional schematic overhead view of an embodiment of the terminal unit 20 of FIG. 13, The previously described inlet air diffuser 30 (e.g., having the first and second layers of perforated material 32, 34) is included in FIG. 14.

In FIGS. 13 and 14, the terminal unit 20 includes a return air chamber 110 and a mixed air chamber 112. The return air chamber 110 is defined by the end walls 59, 72, the side wall 101, and the wall 52 between the return air chamber 110 and the mixed air chamber 112. The mixed air chamber 112 is defined by the wall 52, the end walls 59, 72, and the wall 56 (e.g., described above in FIGS. 8-11 as the common wall 56 between the integral electrical enclosure [not shown in FIGS. 12-14] and the mixed air chamber 112).

A gap 114 is formed between the end wall 59 of the housing 36 and an end 116 of the wall 52, where the gap 114 couples the return air chamber 110 and the mixed air chamber 112. Thus, the fan 38 may draw conditioned air into the housing 36 of the terminal unit 20 via the duct 40, may draw return air into the housing 36 via the return air inlet (see FIG. 14), and may cause the conditioned air and the return air to mix in the mixed air chamber 112. The fan 38 may also output the mixed airflow through an airflow outlet 120 (see FIG. 14) of the housing 36 of the terminal unit 20.

The portions of the terminal unit 20 or corresponding housing 36 that generally define the return air chamber 110 may also form or facilitate the integral sound attenuator 24. For example, portions of the side wall 101 (or panel), the wall 52 (or panel), and the end walls 59, 72 (or panels) may form aspects of the integral sound attenuator 24. Further, top and bottom walls of the terminal unit 20 may form aspects of the integral sound attenuator 24. Any of these features may include fiberglass insulation and/or closed-cell foam that contributes to sound reduction. Focusing in particular on FIG. 13, the wall 52 includes hat-shaped brackets 130 that may extend along upper and lower ends of the wall 52, and may couple the wall 52 to other panels or walls of the housing 36. In the illustrated embodiment, the hat-shaped brackets 130 of the wall 52 extend to the end wall 59 of the housing 36, and that the return air gap 114 extends from the upper hat-shaped bracket 130 to the lower hat-shaped bracket 130. In some embodiments, a body of the wall 52 (e.g., not the hat-shaped brackets 130), may extend to the end wall 59 and the return air gap 114 may be cut from, or otherwise disposed in, the body of the wall 52. In any case, the coupling of the hat-shaped brackets 130, along with the above-described fiberglass insulation and/or closed-cell foam features (which may also be disposed on or in the hat-shaped brackets 130), may contribute to improved sound reduction and attenuation. Further, by integrating the sound attenuation features with the housing 36 (e.g., as opposed to manufacturing and installing a sound attenuator separate from the housing 36), manufacturing and installation costs may be reduced.

One or more of the disclosed embodiments, alone or in combination, may provide one or more technical effects useful in manufacturing, installing, and/or operating a terminal unit of an HVAC system. Disclosed embodiments include a terminal unit having an inlet air diffuser with multiple layers of perforated material, an integral electrical enclosure, an integral sound attenuator, or any combination thereof. As previously described, disclosed embodiments of the terminal unit may enhance performance, improve manufacturing and installation processes and techniques, and reduce cost.

While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:

an enclosure defining a chamber having a first corner and a second corner opposing the first corner;

a fan disposed in the chamber and configured to provide an airflow through the HVAC system by drawing the airflow into a fan inlet and expelling the airflow out of a fan outlet; and an inlet diffuser disposed in the chamber upstream of the fan inlet relative to a direction of the airflow, wherein the inlet diffuser is coupled to the enclosure at the first corner of the chamber and at a mid-section of an enclosure wall extending from and partially defining the second corner of the chamber, and the inlet diffuser includes a first layer of perforated metal and a second layer of perforated metal disposed adjacent to the first layer of perforated metal such that the first layer of perforated metal and the second layer of perforated metal are arranged in series relative to the airflow and configured to enable the airflow to pass therethrough.

2. The HVAC system of claim 1, comprising a terminal unit having the fan and the inlet diffuser.

3. The HVAC system of claim 1, wherein the first layer of perforated metal includes a concave curvature facing away from the fan inlet.

4. The HVAC system of claim 3, wherein the second layer of perforated metal includes an additional concave curvature facing away from the fan inlet.

5. The HVAC system of claim 4, wherein the concave curvature corresponds to the additional concave curvature.

6. The HVAC system of claim 1, comprising a third layer of perforated metal disposed adjacent to the second layer of perforated metal.

7. The HVAC system of claim 6, wherein the first layer of perforated metal includes a first concave curvature facing away from the fan inlet, the second layer of perforated metal includes a second concave curvature facing away from the fan inlet, and the third layer of perforated metal includes a third concave curvature facing away from the fan inlet.

8. The HVAC system of claim 7, wherein the first concave curvature corresponds to the second concave curvature and the third concave curvature.

9. The HVAC system of claim 1, wherein the first layer of perforated metal is positioned between 0.5 inches and 3 inches from the second layer of perforated metal.

10. The HVAC system of claim 1, comprising an air balancing valve configured to open a first amount in response to a first pressure drop and configured to open a second amount greater than the first amount in response to a second pressure drop greater than the first pressure drop.

11. The HVAC system of claim 10, wherein the air balancing valve is disposed upstream of the inlet diffuser relative to the direction of the airflow.

12. A terminal unit of a heating, ventilation, and/or air conditioning (HVAC) system, the terminal unit comprising:

a housing defining an airflow path including a chamber, the chamber including a first corner and a second corner opposing the first corner;

a fan disposed in the chamber and configured to move an airflow through the chamber and into a room; and an inlet diffuser disposed in the chamber upstream of the fan, wherein the inlet diffuser is coupled to the housing at the first corner of the chamber and at a mid-section of a housing wall extending from and partially defining the second corner of the chamber, and the inlet diffuser includes a first layer of perforated metal and a second layer of perforated metal disposed between the first layer of perforated metal and the fan such that the first layer of perforated metal and the second layer of perforated metal are arranged in series relative to the airflow and configured to enable the airflow to pass therethrough.

13. The terminal unit of claim 12, wherein the first layer of perforated metal, the second layer of perforated metal, or both comprises a concave curvature facing away from a fan inlet of the fan.

14. The terminal unit of claim 12, comprising an air balancing valve configured to open a first amount in response to a first pressure drop and configured to open a second amount greater than the first amount in response to a second pressure drop greater than the first pressure drop, wherein the air balancing valve is disposed upstream of the inlet diffuser such that the inlet diffuser is disposed between the air balancing valve and the fan.

15. A terminal unit of a heating, ventilation, and/or air conditioning (HVAC) system, the terminal unit comprising:

a housing defining a first chamber and a second chamber of an airflow path with a separating wall partially separating the first chamber from the second chamber, wherein a conditioned air inlet opening into the first chamber, a return air inlet opening into the second chamber, and an air outlet are formed in panels of the housing;

a fan disposed in the first chamber and configured to bias an airflow from the conditioned air inlet to the air outlet; and an inlet diffuser disposed in the first chamber of the airflow path adjacent to the conditioned air inlet and between the conditioned air inlet and the air outlet, wherein the inlet diffuser is coupled to a first corner of the first chamber and to a mid-section of a housing wall extending from and partially defining the a second corner of the first chamber, and wherein the inlet diffuser includes a first layer of perforated metal and a second layer of perforated metal disposed between the fan and the first layer of perforated metal such that the first layer of perforated metal and the second layer of perforated metal are arranged in series relative to the airflow and configured to enable the airflow to pass therethrough.

16. The HVAC system of claim 1, comprising a duct, wherein:

the inlet diffuser is disposed between the duct and the fan;

the first layer of perforated metal includes a concave curvature facing the duct; and the second layer of perforated metal includes an additional concave curvature facing the duct.

17. The HVAC system of claim 1, wherein the enclosure defines an additional chamber adjacent to the chamber and partially separated from the chamber by a separating wall, and a return air gap fluidly couples the chamber and the additional chamber between the separating wall and an additional enclosure wall.

18. The HVAC system of claim 17, comprising a return air inlet formed in the enclosure and opening into the additional chamber.

19. The HVAC system of claim 18, comprising a duct coupled to a third enclosure wall extending from the first corner to the second corner, wherein the duct is configured to provide a supply air corresponding to the airflow through the HVAC system, and the return air inlet is configured to provide a return air corresponding to an additional airflow through the HVAC system.

20. The HVAC system of claim 19, wherein the air diffuser is positioned to enable the return air corresponding to the additional airflow through the HVAC system to bypass the air diffuser as the return air corresponding to the additional airflow through the HVAC system enters the chamber through the return air gap.

* * * * *